(12) United States Patent
Ku et al.

(10) Patent No.: US 10,763,534 B2
(45) Date of Patent: *Sep. 1, 2020

(54) ELECTRODE ASSEMBLY AND ELECTROCHEMICAL CELL INCLUDING THE SAME

(71) Applicant: LG CHEM, LTD., Seoul (KR)

(72) Inventors: Dae Geun Ku, Daejeon (KR); Hyuk Su Kim, Daejeon (KR); Jun Woo Huh, Daejeon (KR); Hyang Mok Lee, Daejeon (KR); Chang Bum Ahn, Daejeon (KR)

(73) Assignee: LG Chem, Ltd. (KR)

( * ) Notice: Subject to any disclaimer, the term of this patent is extended or adjusted under 35 U.S.C. 154(b) by 106 days.

This patent is subject to a terminal disclaimer.

(21) Appl. No.: 15/861,233

(22) Filed: Jan. 3, 2018

(65) Prior Publication Data

US 2018/0131031 A1    May 10, 2018

Related U.S. Application Data

(63) Continuation of application No. 14/290,728, filed on May 29, 2014, now Pat. No. 9,899,698, which is a
(Continued)

(30) Foreign Application Priority Data

Jun. 28, 2012 (KR) .................. 10-2012-0069832
Jun. 28, 2013 (KR) .................. 10-2013-0075040

(51) Int. Cl.
*H01M 10/04* (2006.01)
*H01M 10/28* (2006.01)
(Continued)

(52) U.S. Cl.
CPC ... *H01M 10/0431* (2013.01); *H01M 10/0413* (2013.01); *H01M 10/0468* (2013.01);
(Continued)

(58) Field of Classification Search
CPC .................. H01M 10/0468; H01M 10/281
See application file for complete search history.

(56) References Cited

U.S. PATENT DOCUMENTS 6,040,085 A * 3/2000 Cheu ................... H01M 2/0275
429/162
6,387,565 B1 * 5/2002 Aihara ................ H01M 2/1673
429/145
(Continued)

FOREIGN PATENT DOCUMENTS

JP    2002-151159 A    5/2002
JP    2008-192432 A    8/2008
(Continued)

OTHER PUBLICATIONS

International Search Report issued in PCT/KR2013/005760, dated Oct. 16, 2013.
(Continued)

*Primary Examiner* — Jeremiah R Smith
(74) *Attorney, Agent, or Firm* — Lerner, David, Littenberg, Krumholz & Mentlik, LLP

(57) ABSTRACT

An electrode assembly according to the present disclosure includes an electrode stack part formed by stacking at least one radical unit having a four-layered structure of a first electrode, a separator, a second electrode and a separator, and an electrode fixing part for wrapping and fixing the electrode stack part. The electrode assembly according to the present disclosure may be fabricated by means of a stacking process other than a folding process, and may accomplish accurate alignment and stable fixing.

13 Claims, 15 Drawing Sheets

Related U.S. Application Data continuation of application No. PCT/KR2013/005760, filed on Jun. 28, 2013.

(51) Int. Cl.
*H01M 10/052* (2010.01)
*H01M 10/0585* (2010.01)

(52) U.S. Cl.
CPC ...... *H01M 10/052* (2013.01); *H01M 10/0585* (2013.01); *H01M 10/281* (2013.01); *H01M 2220/20* (2013.01); *Y02E 60/122* (2013.01)

(56) References Cited

U.S. PATENT DOCUMENTS

| | | |
|---|---|---|
| 2002/0160257 A1 | 10/2002 | Lee et al. |
| 2002/0160258 A1 | 10/2002 | Lee et al. |
| 2006/0159999 A1 | 7/2006 | Kejha et al. |
| 2007/0218355 A1 | 9/2007 | Ryu et al. |
| 2009/0029253 A1 | 1/2009 | Itou et al. |
| 2010/0028769 A1 | 2/2010 | Enomoto et al. |
| 2011/0135996 A1 | 6/2011 | Ahn et al. |
| 2011/0159351 A1* | 6/2011 | Culver ............. H01M 2/0267 429/160 |
| 2011/0195300 A1 | 8/2011 | Daidoji et al. |
| 2011/0223465 A1 | 9/2011 | Kanda |
| 2011/0259505 A1 | 10/2011 | Lee et al. |
| 2011/0269012 A1 | 11/2011 | Perner et al. |
| 2012/0077075 A1 | 3/2012 | Tani et al. |
| 2012/0196167 A1 | 8/2012 | Kim et al. |
| 2012/0225345 A1 | 9/2012 | Kim |
| 2012/0308878 A1 | 12/2012 | Sakashita et al. |
| 2013/0059179 A1 | 3/2013 | Hosaka et al. |
| 2013/0252069 A1 | 9/2013 | Min et al. |
| 2014/0212729 A1 | 7/2014 | Park et al. |

FOREIGN PATENT DOCUMENTS

| | | |
|---|---|---|
| JP | 2010-33922 A | 2/2010 |
| JP | 2010-514112 A | 4/2010 |
| JP | 2011-54503 A | 3/2011 |
| JP | 2011-86506 A | 4/2011 |
| JP | 2015-506059 A | 2/2015 |
| KR | 2001-0082059 A | 8/2001 |
| KR | 2001-0082060 A | 8/2001 |
| KR | 10-2006-0092429 A | 8/2006 |
| KR | 10-2007-0101445 A | 10/2007 |
| KR | 10-2011-0037781 A | 4/2011 |
| KR | 10-2011-0112241 A | 10/2011 |
| WO | WO 2011/040704 A2 | 4/2011 |
| WO | WO 2011/126310 A2 | 10/2011 |
| WO | WO 2011/145608 A1 | 11/2011 |
| WO | WO 2012/074218 A2 | 6/2012 |

OTHER PUBLICATIONS

Extended European Search Report for Appl. No. 13808457.9 dated Oct. 8, 2015.

* cited by examiner

ELECTRODE ASSEMBLY AND ELECTROCHEMICAL CELL INCLUDING THE SAME

CROSS-REFERENCE TO RELATED APPLICATIONS

This application is a Continuation of copending U.S. application Ser. No. 14/290,728 filed on May 29, 2014, which is a Continuation of PCT International Application No. PCT/KR2013/005760 filed on Jun. 28, 2013, which claims priority under 35 U.S.C. § 119(a) to Patent Application Nos. 10-2012-0069832 filed in the Republic of Korea on Jun. 28, 2012 and to 10-2013-0075040 filed in the Republic of Korea on Jun. 28, 2013, all of which are hereby expressly incorporated by reference into the present application.

BACKGROUND OF THE INVENTION

Field of the Invention

The present disclosure relates to an electrode assembly and an electrochemical cell including the same, and more particularly to an electrode assembly fabricated by a stacking method other than a folding method and accomplishing minute alignment and stable fixing, and an electrochemical cell including the same.

Description of the Related Art

Secondary batteries may be classified into various types according to the structure of electrode assemblies. For example, the secondary batteries may be classified into a stack type structure, a wrapping type (jelly-roll type) structure or a stack/folding type structure. For the stack type structure, a cathode, a separator, and an anode are cut into a certain size and then are stacked one by one to form an electrode assembly. In this case, the separator is disposed between the cathode and the anode. For the wrapping type structure, a cathode, a separator, an anode and a separator are formed into sheet shapes, stacked one by one, and then wrapped to form an electrode assembly. For the stack/folding type structure, a full cell or a bicell is formed first, and is wrapped by using a separator sheet to form an electrode assembly. After cutting the cathode, the separator and the anode into a certain size and stacking thereof one by one, the full cell or the bicell may be formed. (The full cell or the bicell respectively includes one or more cathodes, separators and anodes.) The structure of the stack/folding type is disclosed in more detail in Patent Literatures 1 and 2.

However, since the electrode units (cathode, separator and anode) constituting the electrode assembly are stacked separately, the minute alignment of the electrode assembly is very difficult. In addition, a large number of processes are necessary to produce the electrode assembly. In general, for the manufacture of the stack/folding type structure, two lamination apparatuses and one folding apparatus are necessary. Thus, the fabricating process of the electrode assembly is very complicated. Particularly, since the full cells or the bicells are stacked through folding in the stack/folding type structure, the minute alignment of the full cells or the bicells is very difficult.

(Patent Literature 1) Korean Publication Patent No. 2001-0082059
(Patent Literature 2) Korean Publication Patent No. 2001-0082060

SUMMARY OF THE INVENTION

An aspect of the present disclosure considering the above-described defects provides an electrode assembly fabricated by a stacking method other than a folding method and accomplishing minute alignment and stable fixing, and an electrochemical cell including the same.

According to an aspect of the present disclosure, there is provided an electrode assembly including an electrode stack part formed by stacking at least one radical unit having a four-layered structure of a first electrode, a separator, a second electrode and the separator, and an electrode fixing part for wrapping and fixing the electrode stack part. In this case, the radical unit may have an eight-layer structure by repeatedly stacking the four-layered structure.

More particularly, the radical unit may include a bicell formed by stacking the first electrode, the separator, the second electrode, the separator and the first electrode one by one, and a supplementary cell formed by stacking the separator, the second electrode and the separator one by one from one of the first electrode among the two of the first electrodes.

In addition, the radical unit may include a bicell formed by stacking the first electrode, the separator, the second electrode, the separator and the first electrode one by one, a separator stacked on one of the first electrode among the two of the first electrodes, and a supplementary cell formed by staking the separator and the second electrode one by one from one of the other first electrode among the two of the first electrodes.

According to the electrode assembly of the present disclosure, radical units are repeatedly stacked to form an electrode stack part. Thus, the electrode assembly may be formed by means of a stacking process other than a folding process, and the productivity of the electrode assembly may be improved.

In addition, in the electrode assembly of the present disclosure, the electrode assembly may be aligned on the whole by aligning the radical units, and minute alignment of the electrode assembly may be possible.

Further, the electrode stack part of the electrode assembly according to the present disclosure may be fixed through wrapping an electrode fixing part. Thus, a stable fixing may be accomplished.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Exemplary embodiments of the present disclosure will now be described in detail with reference to the accompanying drawings. However, the present disclosure is not limited or restricted to the following exemplary embodiments.

Figure 1:
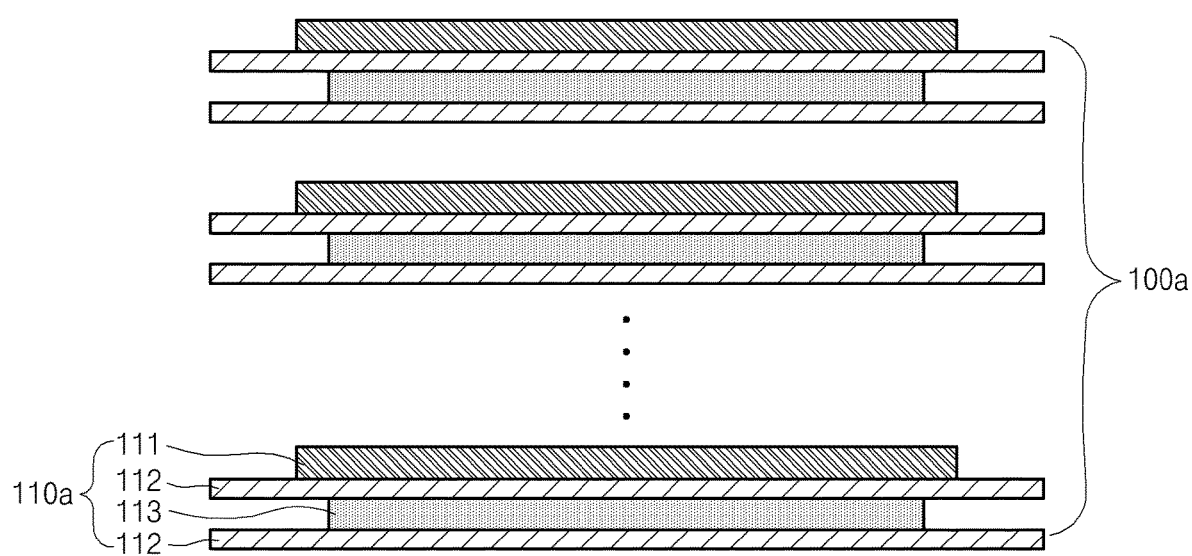
FIG. 1 is a side view illustrating an electrode stack part according to the present disclosure.

The electrode assembly according to the present disclosure basically includes an electrode stack part and an electrode fixing part. First, the electrode stack part will be explained. The electrode stack part (see reference numeral 100a, etc. in FIG. 1) includes at least one radical unit (see 110a, etc. in FIG. 2). That is, the electrode stack part 100 may be formed by including one radical unit 110 or at least two radical units 110. The electrode stack part 100 may be formed by stacking the radical units 110. For example, the electrode stack part 100a may be formed by stacking one radical unit 110a and another radical unit, as illustrated in FIG. 1. As described above, the electrode stack part 100 may be formed by stacking the radical units 110. That is, the radical units 110 may be formed in advance, and then stacked one by one to form the electrode stack part 100.

As described above, the electrode stack part 100 according to the present disclosure is characterized in that the electrode stack part 100 is formed by repeatedly stacking the radical units 110. Through manufacturing the electrode stack part 100 according to the method, the radical units 110 may be precisely aligned, and the productivity may be improved. (For example, a folding process applied in the stack/folding type electrode may be omitted).

Figure 2:
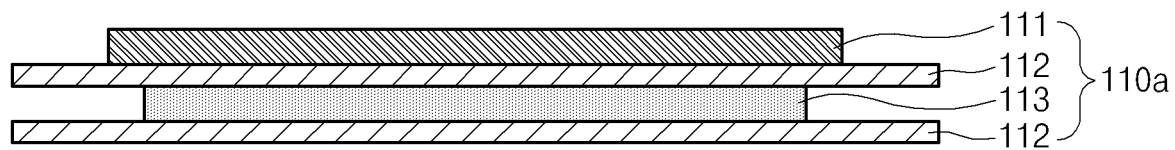
FIG. 2 is a side view illustrating a first structure of a radical unit according to the present disclosure.
Figure 3:
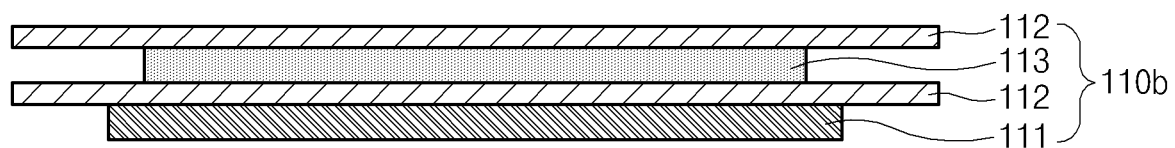
FIG. 3 is a side view illustrating a second structure of a radical unit according to the present disclosure.

The radical unit 100 is formed by stacking a first electrode 111, a separator 112, a second electrode 113 and the separator 112. As described above, the radical unit 110 has a basically four-layered structure. More particularly, the radical unit 110 may be obtained by stacking the first electrode 111, the separator 112, the second electrode 113 and the separator 112 one by one from the upper portion to the lower portion, as illustrated in FIG. 2, or by stacking the first electrode 111, the separator 112, the second electrode 113 and the separator 112 one by one from the lower portion to the upper portion, as illustrated in FIG. 3. In this case, the first electrode 111 and the second electrode 112 may be opposite electrodes from each other. For example, when the first electrode 111 is an anode, the second electrode 113 may be a cathode. Of course, the electrodes may have inverse polarity.

For reference, when the radical units are repeatedly stacked to form the electrode stack part, the first electrode may be positioned at the uppermost portion or the lowermost portion of the electrode stack part. In this case, to avoid direct contact of the first electrode with a case such as a pouch, the separator may be additionally stacked on the first electrode positioned at the outermost portion to insulate the first electrode positioned at the outermost portion and exposed to exterior (for example, the first electrode positioned at the uppermost portion in FIG. 1) from the case. A separator sheet may also be applied instead of the separator. For example, the electrode stack part may be wrapped with the separator sheet to insulate the first electrode positioned at the outermost portion from the case. Alternatively, the first electrode positioned at the outermost portion may be insulated from the case by means of an electrode fixing part, which will be described herein below.

Figure 4:
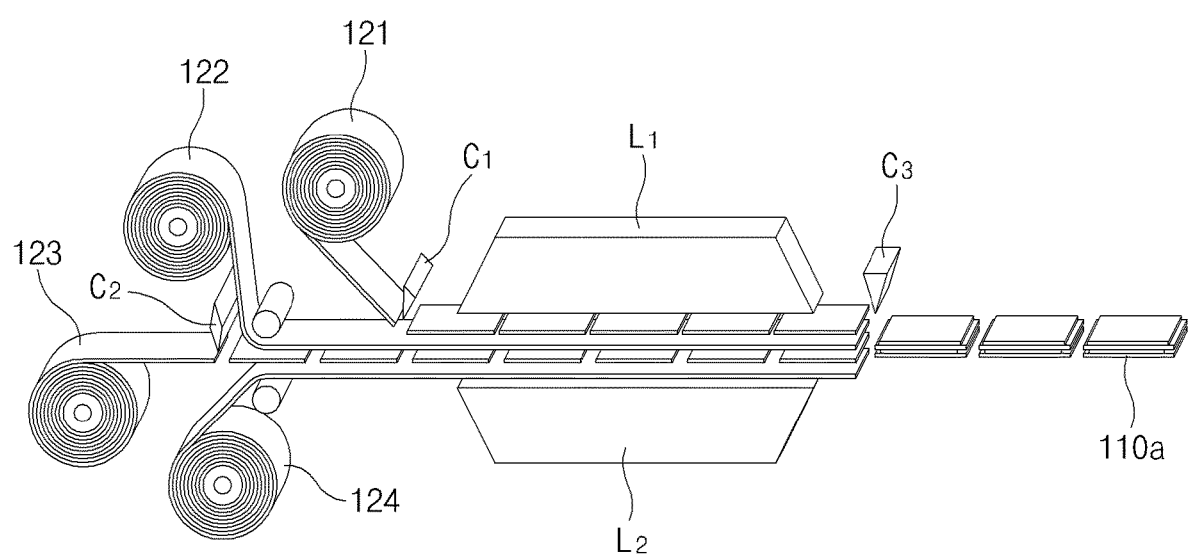
FIG. 4 is a process diagram illustrating a manufacturing process of the radical unit in FIG. 2.

The radical unit 110a may be formed by the following process (see FIG. 4). First, a first electrode material 121, a first separator material 122, a second electrode material 123 and a second separator material 124 are prepared. In this case, the electrode materials 121 and 123 may be cut into a certain size to form the electrodes 111 and 113. The same process is conducted for the first and second separator materials 122 and 124. To automate the manufacturing process, the electrode material and the separator material may have a wrapped shape on a roll. After preparing the materials, the first electrode material 121 is cut into a certain size through a cutter $C_1$. Then, the second electrode material 123 is also cut into a certain size through a cutter $C_2$. After that, the first electrode material 121 having the certain size is supplied on the first separator material 122. The second electrode material 123 having the certain size is also supplied on the second separator material 124. Then, all of the materials are supplied to laminators $L_1$ and $L_2$.

The electrode stack part 100 may be formed by repeatedly stacking the radical units 110 as described above. However, when the electrode and the separator constituting the radical unit 110 are separated from each other, the repetitive stacking of the radical units 110 may be difficult. Thus, the electrode and the separator may be attached to each other when forming the radical unit 110. The laminators $L_1$ and $L_2$ are used to attach the electrode and the separator to each other. That is, the electrode material and the separator material are attached to each other by applying a pressure or a heat and pressure onto the materials by the laminators $L_1$ and $L_2$. Through the attachment, the radical unit 110 may maintain the shape thereof more stably.

Then, the first separator material 122 and the second separator material 124 are cut into a certain size through a cutter $C_3$. By conducting the cutting, the radical unit 110a may be formed. Various kinds of inspections on the radical unit 110a may be additionally conducted as occasion demands. For example, inspections such as a thickness inspection, a vision inspection, a short inspection, and the like may be additionally conducted.

Meanwhile, the surface of the separator (the separator material) may be coated with a coating material having adhesiveness. The coating material may be a mixture of inorganic particles and a binder polymer. (The coating by using the coating material is called an SRS coating.) The inorganic particles may improve the thermal stability of the separator. That is, the inorganic particles may prevent the contraction of the separator at a high temperature. In addition, the binder polymer may fix the inorganic particles. Thus, the inorganic particles may have a certain porous structure. Due to the porous structure, ions may easily move from the cathode to the anode even though the separator is coated with the inorganic particles. In addition, the binder polymer may maintain the inorganic particles on the separator stably to improve the mechanical stability of the separator. In addition, the binder polymer may attach the separator onto the electrode more stably. For reference, the separator may be formed by using a polyolefin-based separator base.

As illustrated in detail in FIGS. 2 and 3, the electrodes 111 and 113 are positioned at both sides of the separator 112, however, the electrode 113 is positioned only at one side of the other separator 112. Thus, the coating material may be coated on both sides of the separator 112, while the coating material may be coated only on one side of the other separator 112. That is, the coating material may be coated on both sides of the separator 112 facing the first electrode 111 and the second electrode 113, and the coating material may be coated on one side of the other separator 112 facing the second electrode 113.

As described above, the attachment within the radical unit by means of the coating material may be sufficient. Thus, the coating may be conducted only on one side of the separator 112 as described above. Since the radical units may be attached to each other by means of a heat press method, etc., the coating may be conducted on both sides of the separator 112 as occasion demands. That is, the separator 112 may be coated on one side facing the second electrode 113 and on the opposite side thereof as occasion demands.

For reference, when a coating material having the adhesiveness is coated on the separator, a direct pressurization onto the separator by using a certain object is not preferred. Generally, the separator is extended lengthily and outward from the electrode. Thus, the terminal of the separator 112 and the terminal of another separator 112 may be combined to each other. For example, the terminal of the separator 112 and the terminal of another separator 112 may be welded to each other by means of an ultrasonic welding. In this case, a direct pressurization on an object using a horn is necessary for conducting the ultrasonic welding. However, the horn may attach to the separator due to the coating material having the adhesiveness when the terminal portion of the separator is directly pressurized by means of the horn. In this case, the apparatus may be out of order. Therefore, the direct pressurization onto the separator by using a certain object is not preferable when the coating material having the adhesiveness is coated on the separator.

Additionally, the radical unit 110 does not necessarily have a four-layered structure. For example, the radical unit 110 may have an eight-layered structure obtained by stacking the first electrode 111, the separator 112, the second electrode 113, the separator 112, the first electrode 111, the separator 112, the second electrode 113 and the separator 112 one by one. That is, the radical unit 110 may be formed as the eight-layered structure by repeating the four-layered structures.

Figure 5:
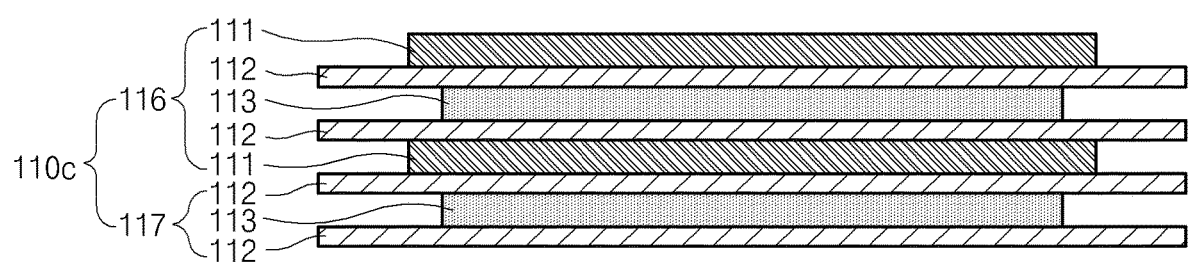
FIG. 5 is a side view illustrating a third structure of a radical unit according to the present disclosure.
Figure 6:
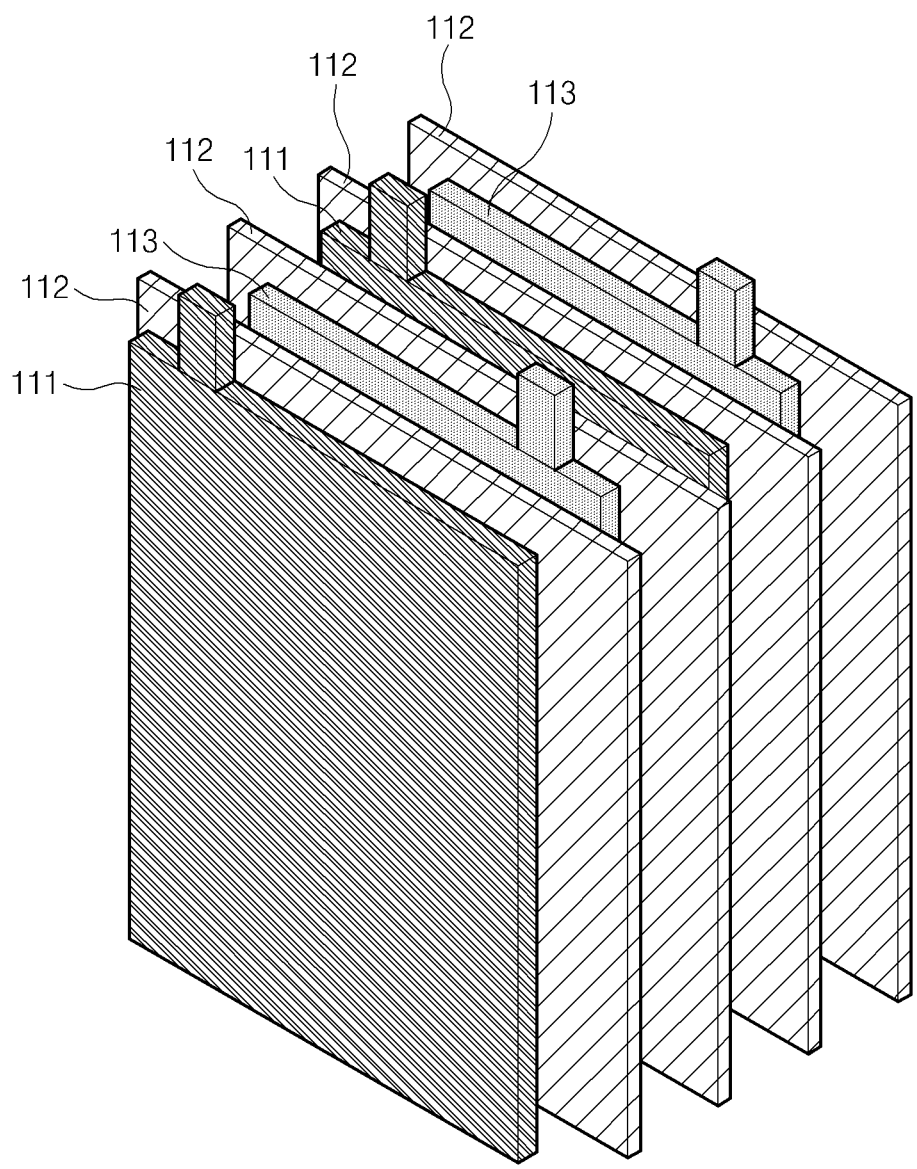
FIG. 6 is an exploded perspective view illustrating the radical unit in FIG. 5.

Exemplary embodiments will be described in more detail. As illustrated in FIGS. 5 and 6, the radical unit 110c may form an eight-layered structure including a bicell 116 and a supplementary cell 117. In this case, the bicell 116 is formed by stacking the first electrode 111, the separator 112, the second electrode 113, the separator 112 and the first electrode 111 one by one from the upper portion to the lower portion (or from the lower portion to the upper portion). In general, when the first electrode is a cathode, the thus obtained structure may be called an A-type bicell, and when the first electrode is an anode, the thus obtained structure may be called a C-type bicell.

The supplementary cell 117 may be formed by stacking the separator 112, the second electrode 113 and the separator 112 one by one from the first electrode 111 of the bicell 116, that is, subsequently from the first electrode 111 of the bicell 116 to outward. In this case, the first electrode 111 of the bicell 116 may be the first electrode 111 positioned at the uppermost portion of the bicell 116, or the first electrode 111 positioned at the lowermost portion of the bicell 116. (FIG. 5 illustrates an example embodiment in which the supplementary cell is stacked on the first electrode positioned at the lowermost portion of the bicell.)

As described above, the electrode stack part 100 may be formed by repeatedly stacking the radical units 110c having the above-described eight-layered structure. (Of course, the electrode stack part may be formed by using only one radical unit.) Through forming the radical unit 110c as described above, the electrode stack part 100 may be formed only by means of the stack process other than the folding process while using one of the A-type bicell or the C-type bicell applied in the stack/folding structure.

Figure 7:
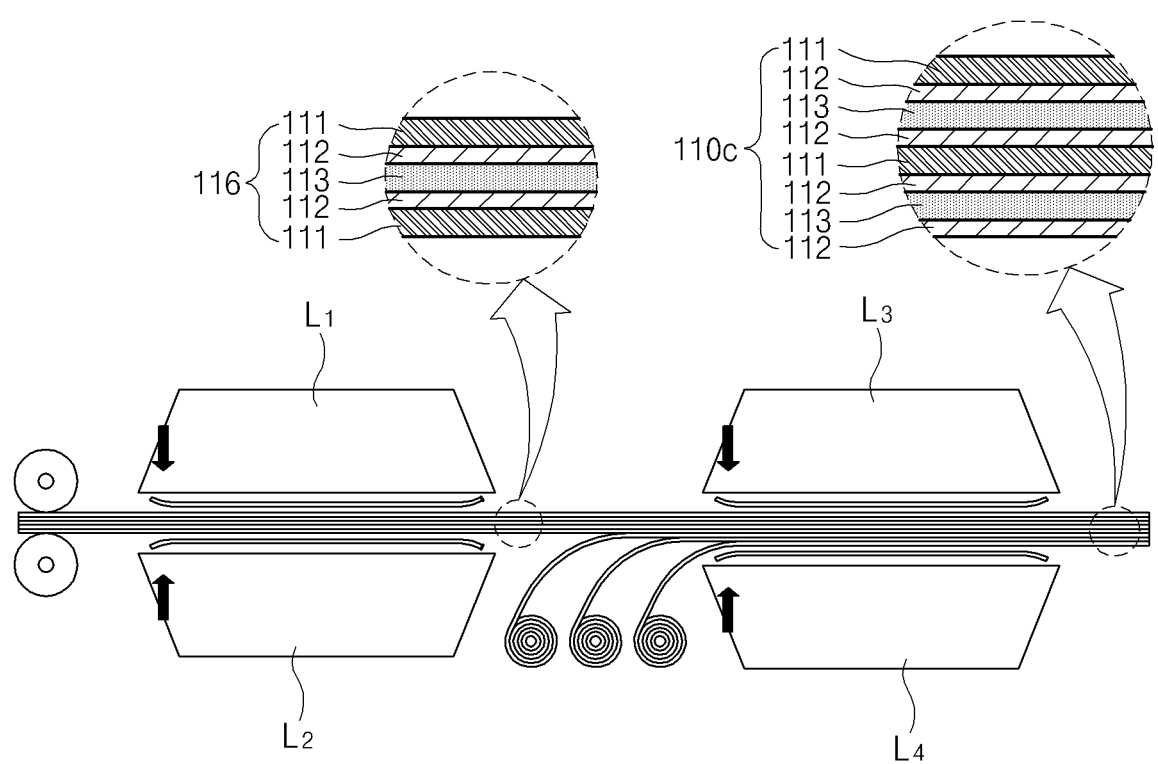
FIG. 7 is a process diagram illustrating a manufacturing process of the radical unit in FIG. 5.

The radical unit 110c having the eight-layered structure as described above may be formed by the following process (see FIG. 7). First, a first electrode material, a separator material, a second electrode material, a separator material and a first electrode material are prepared. Then, these materials are stacked one by one and supplied to first laminators $L_1$ and $L_2$. In the first laminators $L_1$ and $L_2$, the materials are laminated into a corresponding structure of the bicell 116. (The laminating process is the same as the common laminating process.) After that, the separator material, the second electrode material and the separator material are additionally supplied to second laminators $L_3$ and $L_4$. In the second laminators $L_3$ and $L_4$, the materials are laminated into a corresponding structure of the radical unit 110c.

Through forming the radical unit 110c by conducting the above described processes, the common processes may be applied. Thus, the electrode assembly may be fabricated by introducing a new process without a folding process, and the cost consumed for equipment investment may be remarkably decreased. In addition, since the radical unit 110c may be formed by conducting one continuous laminating process, the process may be simplified. Particularly, the second laminating process may be conducted at a lower temperature and under a lower pressure when compared with the first laminating process, the cost may be decreased. Further, the second laminating process may be conducted by laminating the supplementary cell 117 on one side of the bicell 116. Thus, the upper part $L_3$ and the lower part $L_4$ of the second laminator may be operated at different temperatures. Therefore, the power consumption of the second laminator may be decreased.

Figure 8:
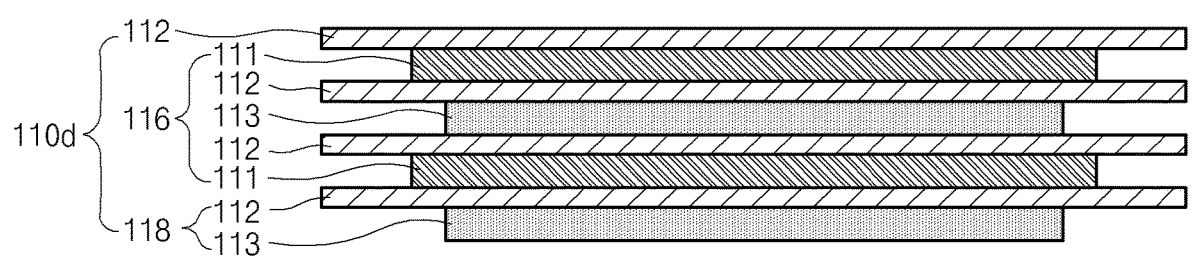
FIG. 8 is a side view illustrating a fourth structure of a radical unit according to the present disclosure.
Figure 9:
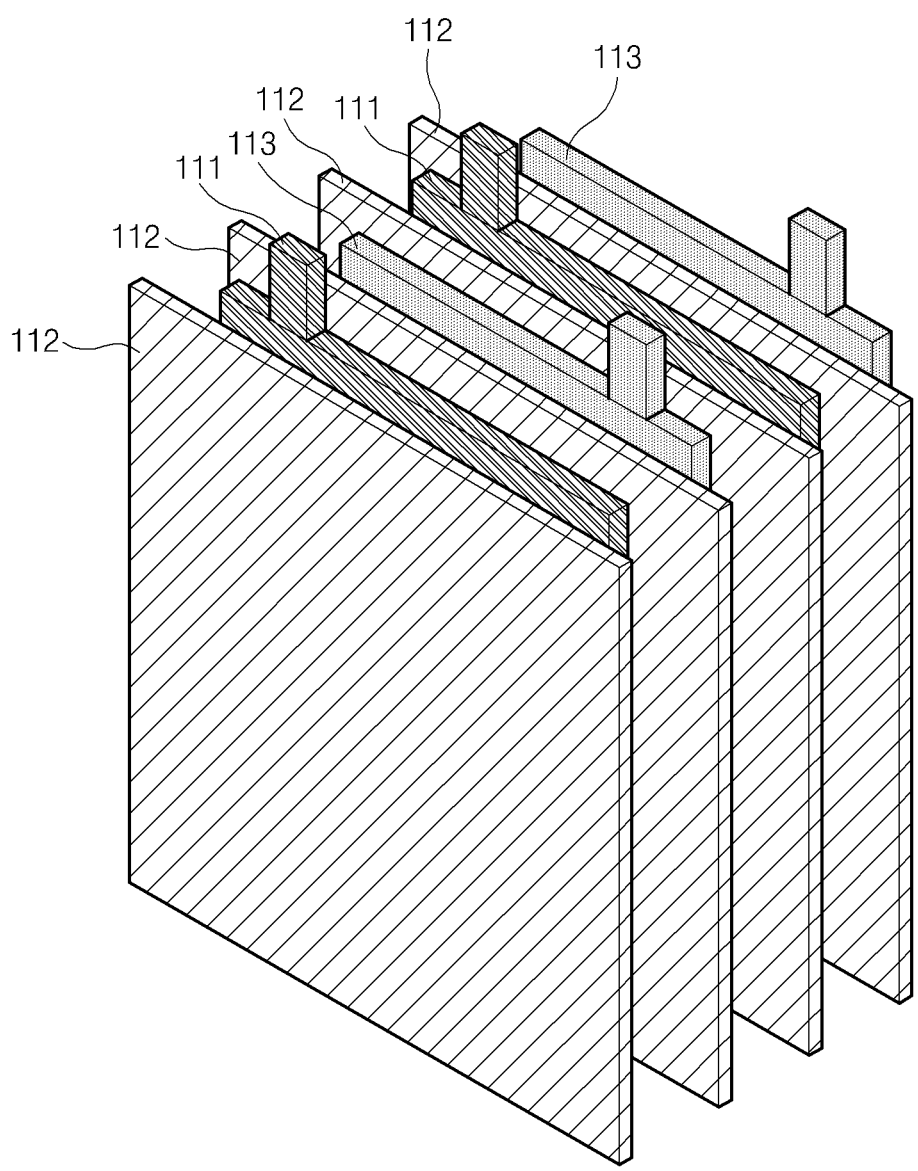
FIG. 9 is an exploded perspective view illustrating the radical unit in FIG. 8.

In addition, the radical unit 110d may have an eight-layered structure as illustrated in FIGS. 8 and 9. That is, as illustrated in FIG. 8, the radical unit 110d may be formed as an eight-layered structure including the bicell 116 formed by stacking the first electrode 111, the separator 112, the second electrode 113, the separator 112 and the first electrode 111 one by one, and the supplementary cell 118 formed by stacking the separator 112 stacked on one of the two first electrodes 111, and the separator 112 and the second electrode 113 stacked on the other one of the two first electrodes 111 one by one. FIG. 8 illustrates an example embodiment in which the separator 112 is stacked on the first electrode 111 positioned at the uppermost portion of the bicell 116, and the supplementary cell 118 is stacked on the first electrode 111 positioned at the lowermost portion of the bicell 116. However, the stacking may be conducted inversely.

Figure 10:
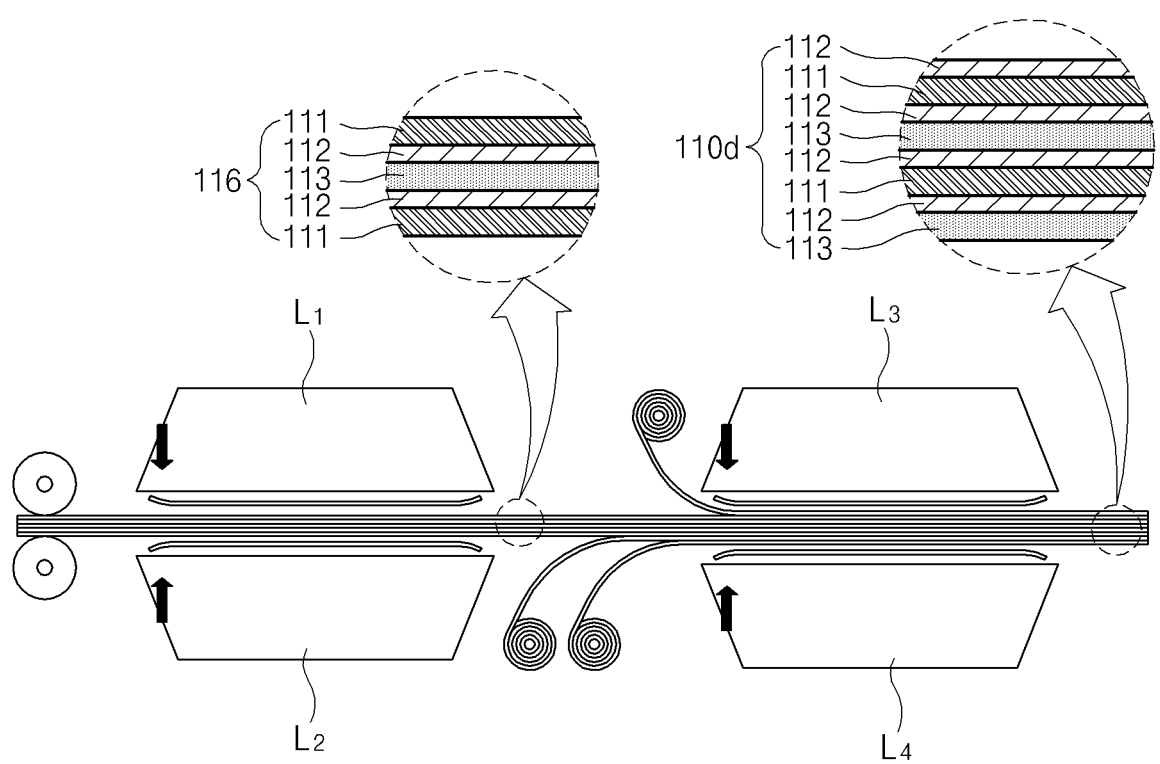
FIG. 10 is a process diagram illustrating a manufacturing process of the radical unit in FIG. 8.

The above-described radical unit 110d having the eight-layered structure may be formed by the following process (see FIG. 10). First, the first electrode material, the separator material, the second electrode material, the separator material and the first electrode material are prepared. Then, these materials are stacked one by one and supplied to the first laminators $L_1$ and $L_2$. In the first laminators $L_1$ and $L_2$, the materials are laminated into a corresponding structure to the bicell 116. (The laminating process is the same as the common laminating process.) Subsequently after that, the materials are supplied to the second laminators $L_3$ and $L_4$ so that the separator 112 may be stacked on the first electrode 111 positioned at the uppermost portion, and so that the separator 112 and the second electrode 113 are stacked one by one from the first electrode 111 positioned at the lowermost portion of the bicell 116 to the outward. In the second laminators $L_3$ and $L_4$, the materials are laminated into a corresponding structure to the radical unit 110d. For reference, the laminating process of the separator 112 on the first electrode 111 positioned at the uppermost portion, and the laminating process of the separator 112 and the second electrode 113 one by one from the first electrode 111 positioned at the lowermost portion of the bicell 116 to the outward may be conducted in separate laminators.

Following the electrode stack part 100, the electrode fixing part 200 will be explained. As described above, the electrode assembly according to the present disclosure is basically characterized in that the electrode stack part 100 is formed only by a stack process other than a folding process. That is, according to the present disclosure, the radical unit 110 is formed by the laminating process, and then, one or more of the radical units 100 are stacked to form the electrode stack part 100. In order to fix the electrode stack part 100 more stably, the electrode assembly according to the present disclosure includes an electrode fixing part 200 for wrapping and fixing the electrode stack part 100. The electrode fixing part 200 may be accomplished in various embodiments as described herein below.

Figure 11:
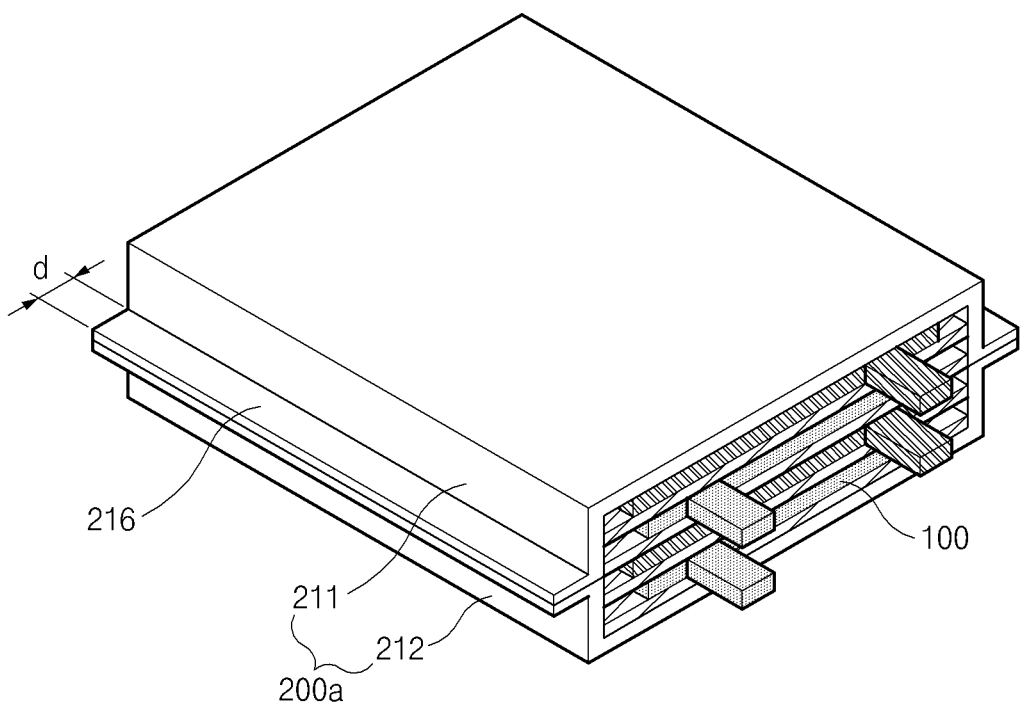
FIG. 11 is a perspective view illustrating the First Embodiment of an electrode fixing part according to the present disclosure.

First, the electrode fixing part 200 may include an upper fixing member 211 provided at the upper portion of the electrode stack part 100, and a lower fixing member 212 provided at the lower portion of the electrode stack part 100, as illustrated in FIG. 11. Here, the lower fixing member 212 may be connected with the upper fixing member 211 to fit closely the electrode stack part 100 along with the upper fixing member 211. Through the fit, the electrode fixing part 200a may fix the electrode stack part 100. That is, the electrode stack part 100 may be fixed by an electrode fixing part 200a by positioning the electrode stack part 100 between the upper fixing member 211 and the lower fixing member 212, and attaching the upper fixing member 211 and the lower fixing member 212 to each other.

In this case, the lower fixing member 212 may be attached to the upper fixing member 211 by means of an ultrasonic welding or a heat sealing. Through the attachment, a closing part 216 may be formed at the attaching part of the upper fixing member 211 and the lower fixing member 212. The closing part 216 may be formed at both sides. Here, the closing part 216 may have a width (d) of about 1 to 5 mm. When the ultrasonic welding is applied, welding strength may be about 30 to 100 gf. In addition, when the heat sealing is applied, a sealing temperature may be from about 120° C. to 180° C., a sealing thickness may be about 50% to 80% of an original material, and a sealing strength may be about 30 to 100 gf.

Figure 12:
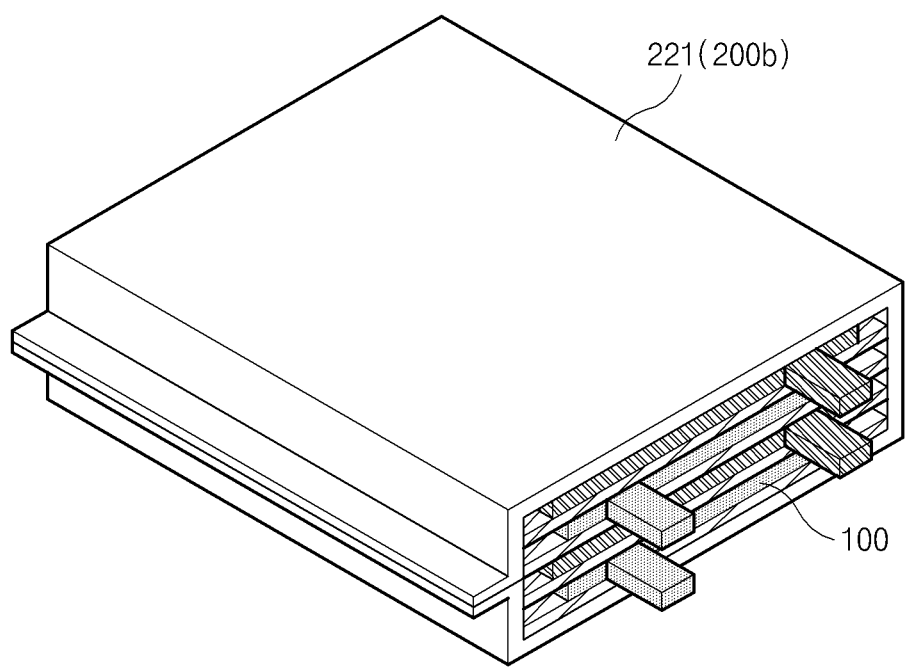
FIG. 12 is a perspective view illustrating the Second Embodiment of an electrode fixing part according to the present disclosure.

Alternatively, an electrode fixing part 200b may be a fixing sheet 221 having a sheet shape and formed to wrap the electrode stack part 100, as illustrated in FIG. 12. In this case, one terminal and the other terminal of the fixing sheet may be connected to each other by means of the ultrasonic welding or the heat sealing to wrap the electrode stack part 100. That is, the electrode stack part 100 may be wrapped while making one round, by using the fixing sheet 221, and the one terminal and the other terminal of the fixing sheet 221 contacting to each other may be connected. Then, the electrode stack part 100 may be fixed by the electrode fixing part 200b.

For reference, the electrode fixing part 200 may be formed by using a different material from the separator 112, for example, by using at least one of a non-woven fabric, PP, PE, and PET. More particularly, the electrode fixing part 200 may be formed by using a non-woven fabric having a pore size of about 1 μm or over. Alternatively, the electrode fixing part 200 may be formed by using at least one of the PP, the PE and the PET having a thickness of about 20 to 100 μm.

Figure 13:
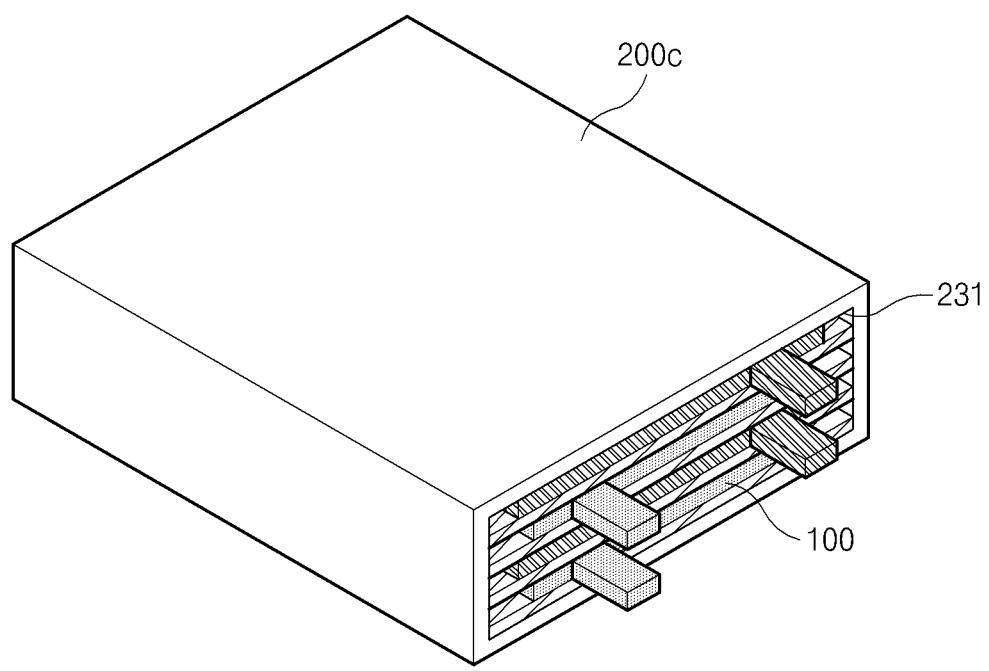
FIG. 13 is a perspective view illustrating the Third Embodiment of an electrode fixing part according to the present disclosure.

In addition, an electrode fixing part 200c may have a tube shape including a first opening 231, a second opening facing the first opening 231, and an inner space extended from the first opening 231 to the second opening for receiving the electrode stack part 100, as illustrated in FIG. 13. The electrode fixing part 200c as described above may closely fit the electrode stack part 100 by the contraction due to heat. That is, by receiving the electrode stack part 100 in the inner space of the electrode fixing part 200c and by heating the electrode fixing part 200c, the electrode fixing part 200c may be contracted and closely fit the electrode stack part 100. Through the fit, the electrode fixing part 200c may fix the electrode stack part 100.

Figure 14:
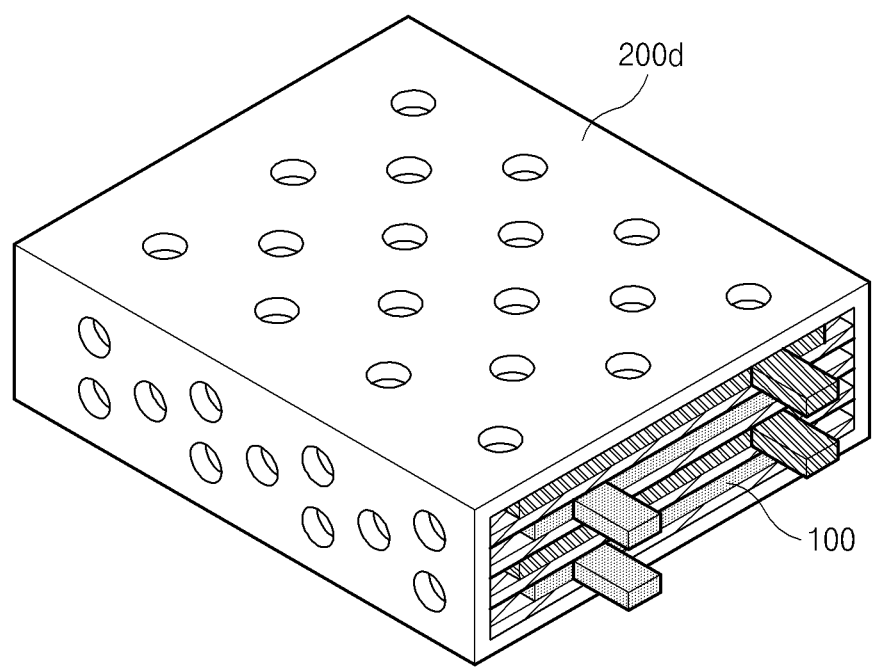
FIG. 14 is a perspective view illustrating the Fourth Embodiment of an electrode fixing part according to the present disclosure.

An electrode fixing part 200d may be formed as a porous insulating tape, as illustrated in FIG. 14. That is, the electrode stack part 100 may be fixed by wrapping the electrode stack part 100 using the porous insulating tape.

Figure 15:
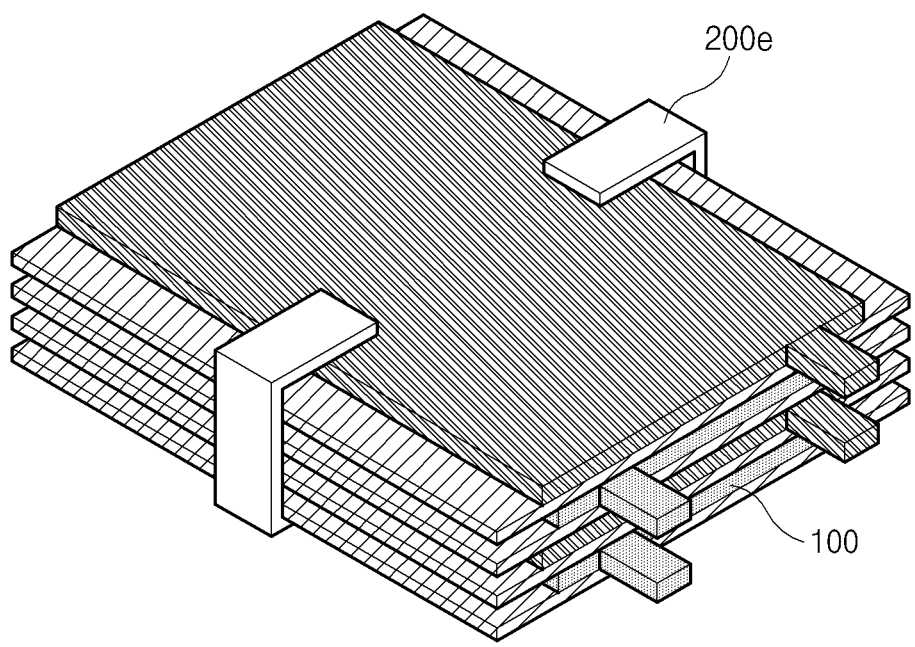
FIG. 15 is a perspective view illustrating the Fifth Embodiment of an electrode fixing part according to the present disclosure.
Figure 16:
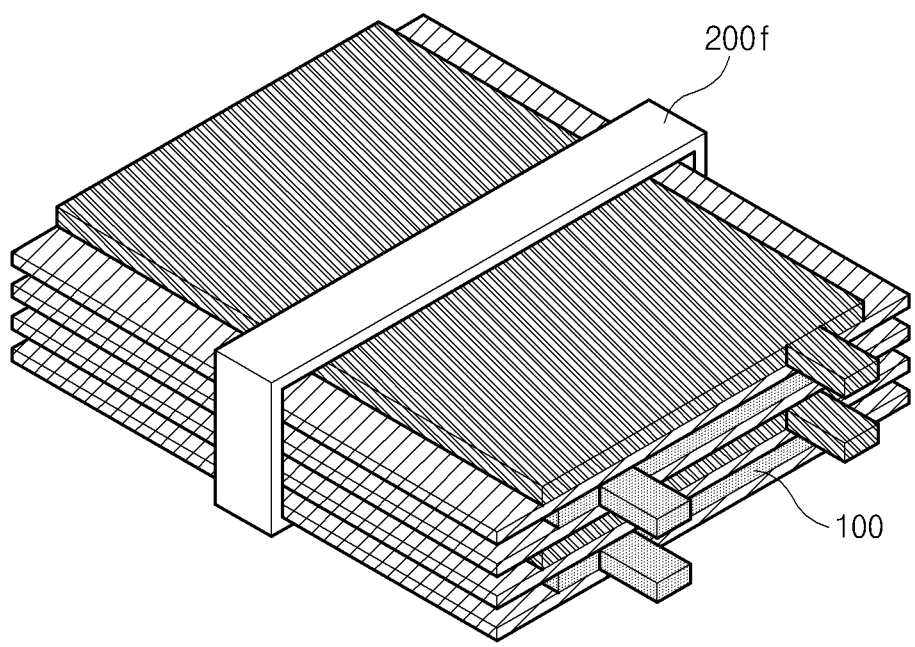
FIG. 16 is a perspective view illustrating the Sixth Embodiment of an electrode fixing part according to the present disclosure.

Finally, an electrode fixing part 200e may be extended from the upper surface of the electrode stack part 100 along the side surface of the electrode stack part 100 to the lower surface of the electrode stack part 100 to fix the electrode stack part 100, as illustrated in FIG. 15. For example, an end portion of a polymer tape is fixed to the upper surface of the electrode stack part 100. Then, the other end portion of the polymer tape is drawn along the side surface of the electrode stack part 100 and is fixed to the lower surface of the electrode stack part 100. In this case, the electrode stack part 100 may be fixed by means of the polymer tape through a heat welding. In addition, as illustrated in FIG. 16, the electrode fixing part 200f may wrap the electrode stack part 100 by at least one round. As described above, the electrode fixing part may not completely wrap the electrode stack part.

Hereinafter, the electrode assembly according to the present disclosure will be explained.

Cathode Structure

A radical unit basically includes a cathode and an anode. In addition, the radical unit includes a separator between the cathode and the anode. The cathode may be manufactured, for example, by coating a mixture of a cathode active material, a conductive material and a mixture of a binder (slurry) on a cathode current collector, drying and pressing. The mixture may further include a filler as occasion demands. The cathode may be formed as a sheet shape and installed on a roll.

[Cathode Current Collector]

A cathode current collector is generally manufactured to a thickness of about 3 to 500 μm. For the cathode current collector, a material not inducing the chemical change and having a high conductivity may be used. For example, stainless steel, aluminum, nickel, titanium, calcined carbon, a surface treated material of aluminum or stainless steel with carbon, nickel, titanium, silver, or the like may be typically used. However, the present disclosure may not be limited thereto. To increase the adhesiveness of a cathode active material, minute embossing may be formed on the surface of the cathode current collector. In addition, the cathode current collector may have various shapes such as a film, a sheet, a foil, a net, a porous body, a foamed body, a non-woven fabric, and the like.

[Cathode Active Material]

A cathode active material for a lithium secondary battery may include, for example, a layered compound of lithium cobalt oxide ($LiCoO_2$), lithium nickel oxide ($LiNiO_2$), etc. or a substituted compound with one or more transition metals; lithium manganese oxide such as $Li_{1+x}Mn_{2-x}O_4$ (in which x is 0 to 0.33), $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$, etc.; Ni site-type lithium nickel oxide represented by Chemical Formula of $LiNi_{1-x}M_xO_2$ (in which, M=Co, Mn, Al, Cu, Fe, Mg, B or Ga, x=0.01 to 0.3); lithium manganese complex oxide represented by Chemical Formula $LiMn_{2-x}M_xO_2$ (in which M=Co, Ni, Fe, Cr, Zn or Ta, and x=0.01 to 0.1) or $Li_2Mn_3MO_8$ (in which, M=Fe, Co, Ni, Cu or Zn); $LiMn_2O_4$ in which a portion of Li is substituted with alkaline earth metal ions; a disulfide compound; $Fe_2(MoO_4)_3$, and the like. However, the present disclosure may not be limited thereof.

Generally, a conductive material is added into a mixture including the cathode active material by 1 to 50 wt % based on the total amount of the mixture. The conductive material may be formed by using a material having conductivity without inducing chemical change. For example, graphite such as natural graphite, synthetic graphite, etc.; carbon black such as carbon black, acetylene black, ketjen black, channel black, furnace black, lamp black, thermal black, etc.; conductive fiber such as carbon fiber, metal fiber, etc.; a metal powder such as a carbon fluoride powder, an aluminum powder, a nickel powder, etc.; conductive whisker such as potassium titanate, etc.; conductive metal oxide such as titanium oxide, etc.; a conductive material such as polyphenylene derivatives, etc. may be typically used.

A binder is a component assisting the bonding of the active material with the conductive material and the bonding with the current collector, and is commonly included by about 1 to 50 wt % based on the total amount of the mixture including the cathode active material. Typical examples of the binder may include polyfluoro vinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated EPDM, styrene butadiene rubber, fluorine rubber, various copolymers, etc.

A filler is a component restraining the expansion of the cathode and may be selectively used. A material not inducing chemical change and having a fiber phase may be used without limitation. For example, an olefin-based polymer such as polyethylene, polypropylene, and the like; fiber phase material such as glass fiber, carbon fiber, and the like may be used.

Anode Structure

An anode may be manufactured by coating an anode current collector with an anode active material, drying and pressing. A conductive material, a binder, a filler, etc. may be selectively included as occasion demands. The anode may be formed as a sheet shape and may be installed on a roll.

[Anode Current Collector]

An anode current collector is generally manufactured to a thickness of about 3 to 500 μm. For the anode current collector, a material not inducing chemical change and having conductivity may be used. For example, copper, stainless steel, aluminum, nickel, titanium, calcined carbon, a surface treated material of copper or stainless steel with carbon, nickel, titanium, silver, an aluminum-cadmium alloy, etc. may be used. Also, to increase the adhesiveness of the anode active material, minute embossing may be formed on the surface of the anode current collector. The anode current collector may have various shapes such as a film, a sheet, a foil, a net, a porous body, a foamed body, a non-woven fabric, etc.

[Anode Active Material]

An anode active material may include, for example, carbon such as non-graphitizable carbon, graphite-based carbon, etc.; a metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements found in Group 1, Group 2 and Group 3 in a periodic table, halogen; $0 < x \leq 1$; $1 \leq y \leq 3$; $1 \leq z \leq 8$), etc.; a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; a conductive polymer such as polyacetylene, etc.; Li—Co—Ni-based material, etc.

Separator Structure

A separator (a separator sheet) may be melt by the pressure, or the heat and pressure of a laminator to be attached onto the cathode or the anode. When the pressure is applied from the laminator, the electrode and the separator (the separator sheet) may make a stable interface contact. (Further, the contact may be accomplished separately through the above-described SRS coating.)

The separator (the separator sheet) may have insulating properties. In addition, the separator may have a porous structure for the movement of ions. Generally, the separator may have the pore diameter of from about 0.01 to 10 μm. The thickness of the separator may be generally about 5 to 300 μm. The separator may be formed into a thin film having high ion transmittance, high mechanical strength and high insulating properties. For example, the separator (the separator sheet) may be an olefin-based polymer such as chemical-resistant and hydrophobic polypropylene, etc; a sheet or a non-woven fabric formed by using glass fiber or polyethylene, etc.

When a solid electrolyte such as a polymer is used as an electrolyte, the solid electrolyte may also function as the separator. For example, a polyethylene film, a polypropylene film, or a multi-layered film obtained by combining the films, or a polymer film for a polymer electrolyte or a gel-type polymer electrolyte such as polyvinylidene fluoride, polyethylene oxide, polyacrylonitrile, or polyvinylidene fluoride hexafluoropropylene copolymer, may be used.

Hereinafter, an electrochemical device in which the electrode assembly according to the present disclosure may be applicable, will be explained.

The electrode assembly according to the present disclosure may be applied in an electrochemical cell producing electricity through the electrochemical reaction of a cathode and an anode. Typical examples of the electrochemical cell include a super capacitor, an ultra capacitor, a secondary battery, a fuel battery, an apparatus for electrolysis, an electrochemical reactor, and the like. The electrode assembly according to the present disclosure may be particularly and preferably applied in the secondary battery (for example, lithium secondary battery).

A lithium secondary battery is used as a power source of a medium and large size device as well as a small size device. When the lithium secondary battery is used as the power source of the medium and large size device, a battery module may be preferably formed by using the secondary battery according to the present disclosure as one unit battery. A battery pack including the battery module may be used as a power source in a power tool; an electric vehicle selected from the group consisting of an electric vehicle (EV), a hybrid electric vehicle (HEV), and a plug-in hybrid electric vehicle (PHEV); an E-bike; an E-scooter; an electric golf cart; an electric truck; an electric commercial vehicle, and the like.

While the present disclosure has been shown and described in connection with the exemplary embodiments, it will be apparent to those skilled in the art that modifications and variations can be made without departing from the spirit and scope of the invention as defined by the appended claims.

INDUSTRIAL APPLICABILITY

The present disclosure relates to an electrode assembly fabricated by a stacking method other than a folding method and accomplishing minute alignment and stable fixing, and an electrochemical cell including the same, so that the present disclosure has industrial applicability.

What is claimed is:

1. An electrode assembly comprising: an electrode stack part obtained by stacking at least one radical unit including a four-layered structure of a first electrode, a first separator, a second electrode, and a second separator; and an electrode fixing part for wrapping and fixing the electrode stack part,
wherein the radical unit is formed by attaching the electrodes and the separators to each other,
wherein each of the electrodes includes an electrode current collector and an electrode active material coated on the electrode current collector,
wherein a first surface of the first separator is coated with a coating material having adhesiveness to allow the coating material of the first surface of the first separator to be adhered to the electrode active material of the first electrode,
wherein the coating material is a mixture of inorganic particles and a binder polymer, and
wherein a second surface of the first separator is uncoated with the coating material having adhesiveness to permit direct pressurization onto the second surface.

2. The electrode assembly of claim 1, wherein the radical unit has an eight-layered structure obtained by repeatedly stacking the four-layered structures.

3. The electrode assembly of claim 2, wherein the radical unit comprises a bicell formed by stacking the first electrode, the first separator, the second electrode, the second separator and the first electrode one by one, and a supplementary cell formed by stacking the first separator, the second electrode and the second separator one by one from one of the first electrode among the two of the first electrodes.

4. The electrode assembly of claim 2, wherein the radical unit comprises a bicell formed by stacking the first electrode, the first separator, the second electrode, the second separator and the first electrode one by one, a first separator stacked on one of the first electrode among the two of the first electrodes, and a supplementary cell formed by stacking the second separator and the second electrode one by one from one of the other first electrode among the two of the first electrodes.

5. The electrode assembly of claim 1, wherein the attachment of the first electrode and the first separator is an attachment through applying a pressure onto the first electrode and the first separator, or an attachment through applying a pressure and heat onto the first electrode and the first separator.

6. The electrode assembly of claim 1, wherein the electrode fixing part comprises an upper fixing member provided on an upper portion of the electrode stack part, and a lower fixing member provided under the electrode stack part, the lower fixing member being connected with the upper fixing member, the lower fixing member and the upper fixing member closely fitting the electrode stack part.

7. The electrode assembly of claim 6, wherein the lower fixing member is attached to the upper fixing member by means of an ultrasonic welding or a heat sealing.

8. The electrode assembly of claim 1, wherein the electrode fixing part is obtained by wrapping the electrode stack part with a fixing sheet having a sheet shape.

9. The electrode assembly of claim 8, wherein one end and the other end of the fixing sheet are attached to each other by means of an ultrasonic welding or a heat sealing to wrap the electrode stack part.

10. The electrode assembly of claim 1, wherein the electrode fixing part has a tube shape providing a first opening, a second opening facing the first opening, and an inner space extended from the first opening to the second opening for receiving the electrode stack part.

11. The electrode assembly of claim 10, wherein the electrode fixing part fits the electrode stack part by a contraction due to heat.

12. The electrode assembly of claim 1, wherein the electrode fixing part is extended from an upper surface of the electrode stack part along a side surface of the electrode stack part to a lower surface of the electrode stack part to fix the electrode stack part.

13. The electrode assembly of claim 12, wherein the electrode fixing part wraps the electrode stack part by at least one round.

* * * * *